United States Patent
Schafer et al.

(10) Patent No.: US 7,047,923 B2
(45) Date of Patent: May 23, 2006

(54) DEVICE FOR VARYING VALVE TIMING IN AN INTERNAL COMBUSTION ENGINE

(75) Inventors: Jens Schafer, Herzogenaurach (DE); Martin Steigerwald, Erlangen (DE); Jonathan Heywood, Pettstadt (DE)

(73) Assignee: INA-Schaeffler KG (DE)

( * ) Notice: Subject to any disclaimer, the term of this patent is extended or adjusted under 35 U.S.C. 154(b) by 3 days.

(21) Appl. No.: 11/041,036

(22) Filed: Jan. 21, 2005

(65) Prior Publication Data

US 2005/0217621 A1    Oct. 6, 2005

Related U.S. Application Data

(63) Continuation of application No. PCT/EP03/007712, filed on Jul. 16, 2003.

(60) Provisional application No. 60/398,624, filed on Jul. 25, 2002.

(51) Int. Cl.
*F01L 1/34* (2006.01)

(52) U.S. Cl. .............. 123/90.16; 123/90.27; 123/90.31; 74/640

(58) Field of Classification Search ............ 123/90.15, 123/90.16, 90.17, 90.18, 90.2, 90.27, 90.31, 123/90.6; 74/640, 665 Q
See application file for complete search history.

(56) References Cited

U.S. PATENT DOCUMENTS

| | | | |
|---|---|---|---|
| 3,977,275 A | | 8/1976 | Kieswetter et al. |
| 4,742,729 A | * | 5/1988 | Cordara ........................ 74/640 |
| 6,848,401 B1 | * | 2/2005 | Takenaka et al. ......... 123/90.15 |
| 2002/0017257 A1 | | 2/2002 | Axmacher et al. |

* cited by examiner

*Primary Examiner*—Thomas Denion
*Assistant Examiner*—Ching Chang
(74) *Attorney, Agent, or Firm*—Charles A. Muserlian

(57) ABSTRACT

A device for varying valve timing in an internal combustion engine comprises an adjusting mechanism for varying an angle of rotation between a drive pinion (2) and a camshaft (end portion of the camshaft 1), said adjusting mechanism being configured as a wobble transmission. The drive pinion (2) comprises a first front-end gearing (9) and a disk (10) comprises a second front-end gearing (11), which first and second front-end gearings mesh partially with each other, and the number of teeth of said front-end gearings differ from each other by at least one tooth. To reduce the overall dimensions of the device and avoid gearing lash, it is proposed, on the one hand, to connect the disk (10) rotationally fast to the camshaft (1) and on the other hand, to configure the disk (10) in axial direction of the camshaft (1) as a flexible element that can be deformed in axial direction by an adjusting device (thrust plate 17).

9 Claims, 2 Drawing Sheets

DEVICE FOR VARYING VALVE TIMING IN AN INTERNAL COMBUSTION ENGINE

This application is a continuation of PCT/EP2003/007712 filed Jul. 16, 2003 which claims benefit of Provisional Pat. 60/398,624 filed Jul. 25, 2002.

FIELD OF THE INVENTION

The invention concerns a device for varying valve timing in an internal combustion engine, said device comprising an adjusting mechanism for varying an angle of rotation between a drive pinion and a camshaft, said adjusting mechanism being configured as an eccentric axial transmission comprising an adjusting element, said adjusting element being connected rotationally fast to the drive pinion and comprising a first front-end gearing, said adjusting mechanism further comprising a disk comprising a second front-end gearing in a radially outer region, an adjusting movement being imparted to the second front-end gearing by an adjusting device, so that said first and second front-end gearings are brought to mesh partially with each other, teeth of said first and second front-end gearings differing in number by at least one.

Devices for varying valve timing are known in which the adjustment of the camshaft relative to the drive pinion is effected hydraulically, i.e. a rotary adjustment is achieved by means of a piston that is displaceable in axial direction of the camshaft and a helical gearing operatively connected thereto, or the hydraulic adjusting system comprises an oscillating vane or vane-and-cell adjuster that can convert the hydraulic pressure directly into a rotary movement without the need of a helical gearing. Further, electromechanical adjusting systems are also known that comprise a planetary transmission in which one of the shafts is connected to a rotor of an electromotor.

A device of the initially cited type for varying valve timing in an internal combustion engine is known from EP 1 178 185 A2. The disk in this device comprises at least one front-end gearing that meshes partially both with gearings of a first component connected rotationally fast to the drive pinion and of a further component connected rotationally fast to the camshaft. The disk itself is guided for rotation through a rolling bearing on a shaft journal of the adjusting device. The mounting arrangement as a whole takes a position that is angularly offset to the transverse plane of the longitudinal axis of the camshaft. This causes a wobbling movement of the disk as a whole so that teeth of the disk mesh partially with teeth of both the components.

Due to the existing gearings and the configuration of the eccentric axial transmission as a wobbling drive, the overall dimensions of this adjusting device are unfavorable, so that it does not fit into every given design space on the front end of an internal combustion engine installed in the motor vehicle. Besides this, there are considerable problems in achieving a lash-free operation between the gearings of this torque converter (adjusting transmission). Thus, during the operation of the internal combustion engine, a considerable amount of undesired noise can be produced, the reason for which, in the first place, lies in the strongly varying alternating torque of the camshaft, but in the last analysis, in the gearing lash. Any lash occurring in the transmission is converted in keeping with the multiplication ratio of the adjusting shaft to the driving or driven shaft of the transmission. But existing component lash is also multiplied, so that a slight rotary lash between flanks of the gearing of the adjusting shaft and the counter gearwheel meshing therewith is also multiplied, and noise generation is promoted. Moreover, due to the wobbling motion in a wobbling transmission, a so-called "erecting" torque (unbalance torque) is produced during adjustment.

OBJECTS OF THE INVENTION

It is an object of the invention to avoid the aforesaid drawbacks and thus provide a high-multiplication three-shaft transmission that, on the one hand, has an extremely compact construction with a corresponding weight advantage and, on the other hand, is free from unbalance torques and has minimized gearing lash. This and other objects and advantages of the invention will become obvious from the following detailed description.

SUMMARY OF THE INVENTION

The invention achieves the above objects by the fact that the disk is connected rotationally fast to the camshaft and is configured in axial direction of the camshaft as a flexible element, and the adjusting device deforms the flexible disk in axial direction. In this way, a second gearing between the disk and the camshaft and a mounting of the disk on a rolling or sliding bearing on a shaft journal of the adjusting device can be dispensed with. On the whole, this enables a substantially more compact realization of the mechanism. Besides this, due to the flexible configuration of the disk, a lash-free meshing of the gearing of the disk and the counter gearing can be realized. Depending on the kinematics that results from the design and the movement of the eccentric axial transmission in combination with the configuration of the gearing, a single, double or multiple meshing of gearings is obtained that increases the number of load-bearing teeth and thus results in a compact structure. For realizing a high-multiplication three-shaft transmission, the number of teeth of the disk and the adjusting element will differ, as is common practice, at least by one tooth.

According to a further feature of the invention, the adjusting device can be configured as a thrust plate that bears against an outer surface of the flexible disk opposite from the second front-end gearing. This pressure plate is connected to a rotor of an electromotor and deforms the disk such that the gearing of the disk meshes partially at one or more points with the counter gearing.

Further, the thrust plate may comprise one or more defined elevations on a surface oriented toward the disk. The possibility also naturally exists to configure the aforesaid surface of the thrust plate as a whole in a plane extending at a slant to the transverse plane of the camshaft. There are also other possibilities of giving the surface an almost harmonic shape, for example, in that it is configured to follow a sine function. The number of portions in which the thrust plate comprises elevations corresponds to the number of meshing points. A plurality of teeth mesh at each meshing point and the number of load-bearing teeth increases with the torque acting between the driving and the driven shaft. When the thrust plate rotates, the elevated portions rotate with it and this results in a relative movement of the disk to the adjusting element.

Further, the thrust plate can be supported with its surface oriented away from the disk on a housing wall of the adjusting device. In this way, it becomes possible to make the thrust plate with thinner walls or out of a light material. The thrust plate and/or the rotor can be made, for example, of a light metal or plastic, or of a composite material. This advantageously minimizes the mass moment of inertia of the relatively moving components.

The surface of the adjusting element oriented toward the disk preferably has a substantially crowned configuration. This advantageously enables the disk, that is fixed rotationally fast on the camshaft, to be deformed about its point of fixation, so that, in the partially deformed regions, the gearing provided on the outer periphery of the disk bears surfacewise against the counter gearing.

According to a further proposition of the invention, the thrust plate receives rolling elements through which it is mounted axially on the disk. For this purpose, the thrust plate may comprise, for example, concave pockets in which the rolling elements are guided. In the same way, rolling elements may also be arranged on the side of the thrust plate oriented toward the housing wall. Through this axial mounting of the thrust plate on rolling elements, a drive with low friction on the whole is realized, so that, naturally, a premature wear of the components can also be prevented. The rolling elements are preferably configured as cylindrical or needle rollers. It is further also possible to guide the rolling elements in a cage and configure them with different diameters.

According to a further feature of the invention, the disk is rotationally fixed at its radially inner portion through at least one ring that is braced against the camshaft by a central screw. The disk is clamped at its radially inner portion between an annular bearing surface of the camshaft and this ring, so that a force-locked connection results between the disk and the camshaft. The force-locking can be enhanced through additional diamond- or tungsten carbide-coated shims. If this force-locked connection is inadequate for the function, a positive connection can also be used in its place in which the disk comprises on its radially inner portion, recesses or projections that interlock with corresponding projections and recesses both of the ring and the bearing surface of the camshaft.

According to a final proposition of the invention, both the thrust plate and a rotor cooperating therewith are mounted on the camshaft. The mounting means, which is preferably configured as a needle roller bearing, may be arranged on the outer periphery of the ring that braces the disk against the camshaft.

BRIEF DESCRIPTION OF THE DRAWING

Further features of the invention will become obvious from the following detailed description and the drawing in which an example of embodiment of the invention is shown in a simplified representation.

DETAILED DESCRIPTION OF THE DRAWING

Figure 1:
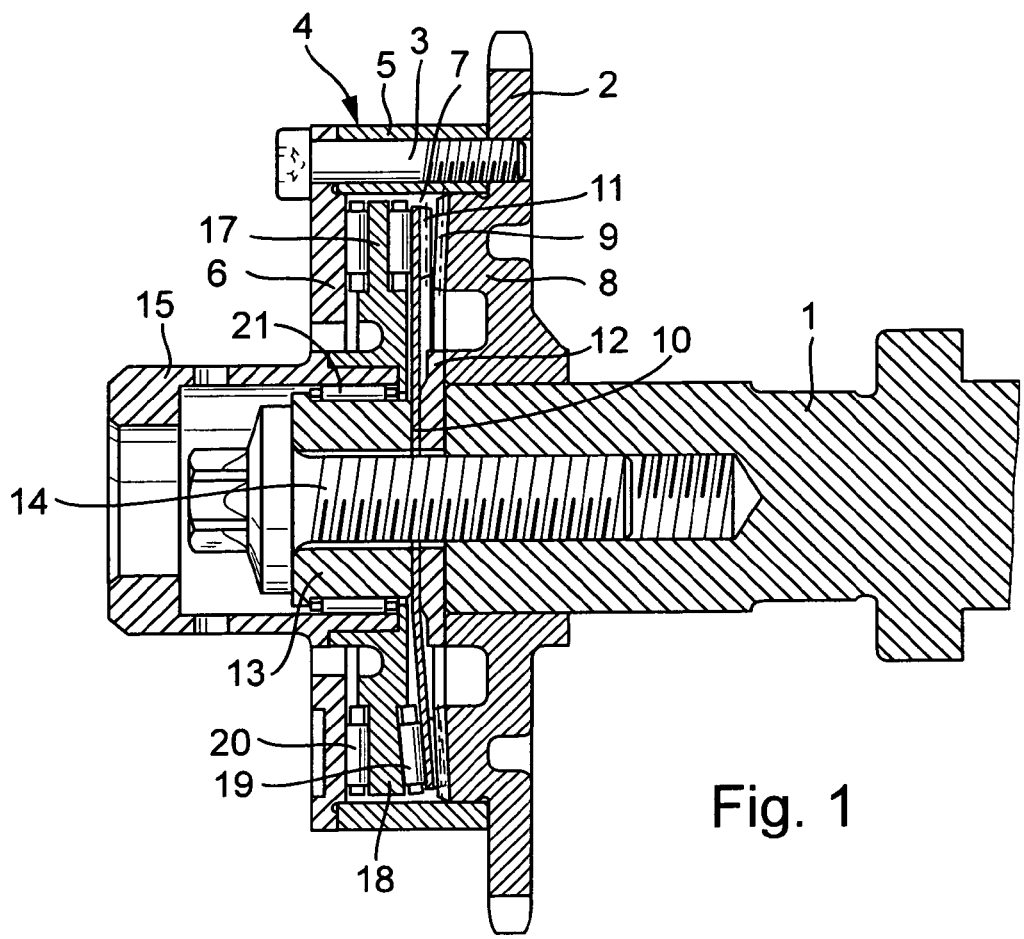
FIG. 1 is a longitudinal section through a device of the invention for varying valve timing in an internal combustion engine.

In FIG. 1, an end portion of a camshaft of an internal combustion engine is identified at 1. A drive pinion 2 configured as a chain sprocket is mounted for rotation on the camshaft. This drive pinion 2 is driven by a driven pinion, not shown, of a crankshaft of the internal combustion engine through a chain, also not shown. It is understood that in place of the chain, it is also possible to use a toothed belt or gearwheel drive together with a drive pinion matched to the tooth pitch of the toothed belt. A housing 4 comprising an annular housing part 5 and a disk-shaped housing wall 6 is braced against the drive pinion, 2 by fixing screws 3. The drive pinion 2, the annular housing part 5 and the disk-shaped housing wall 6 together define an inner space 7 of the housing 4.

On its front end oriented toward the inner space 7, the drive pinion 2 comprises a portion serving as an adjusting element 8 and comprising a first front-end gearing 9. A disk 10 that is capable of being deformed in the axial direction of the camshaft is arranged rotationally fast on the end portion 1 of the camshaft. The disk 10 comprises a second front-end gearing 11 that, in a state in which it is not deformed, does not mesh with the first front-end gearing 9. The disk 10 is fixed on the end portion 1 of the camshaft by being clamped between a flange 12 and a ring 13 with the help of a central screw 14. This central screw 14 comprises a collar and is screwed axially into the end portion 1 of the camshaft. The ring 13 further serves to support a rotor 15 that, as shown schematically in FIGS. 3 and 4, cooperates with a stator 16 of an electromotor drive. The rotor 15 is configured as an adjusting shaft and is connected to a motor shaft, not shown.

A thrust plate 17 serving as an adjusting device is connected rotationally fast to the rotor 15. At at least one point of its end face oriented toward the disk 10, the thrust plate 17 comprises an elevation 18 which can be seen in FIG. 1 in the lower half of the sectional representation. This elevation 18 deforms the disk 10 so far in axial direction that its second front-end gearing 11 meshes partially with the first front-end gearing 9 of the adjusting element 8. This first front-end gearing 9 has a convex contour. Two sets of cylindrical rollers 19 and 20 are arranged in the thrust plate 17. The first set of cylindrical rollers 19 bears against the end face of the disk 10 oriented away from the second front-end gearing 11, while the thrust plate 17 is supported through the second set of cylindrical rollers 20 on the disk-shaped housing wall 6. Further, the rotor 15, together with the thrust plate 17, is mounted through a needle roller bearing 21 on an outer periphery of the ring 13.

As an alternative, it is possible to omit the cylindrical rollers 19, so that an appropriately configured thrust plate would then slide on the disk. Besides this, it is also possible to arrange the cylindrical rollers only in a cage. This arrangement would then replace the thrust plate. The cylindrical rollers could then be configured with different diameters.

Figure 2:
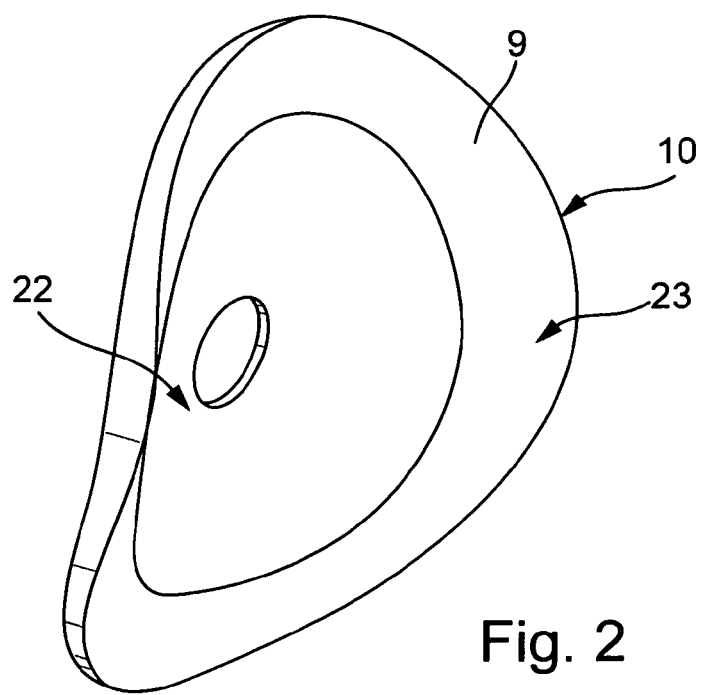
FIG. 2 is a view of a disk used in the device of FIG. 1, in a partially deformed state.

FIG. 2 illustrates the flexible deformation of the disk 10. In this illustration, the edge of the disk 10 comprising the second front-end gearing 11 is deformed so far in axial direction in a first region 22 and in a second region 23 that the front-end gearings 9 and 11 mesh with each other in both these regions 22 and 23.

Figure 3:
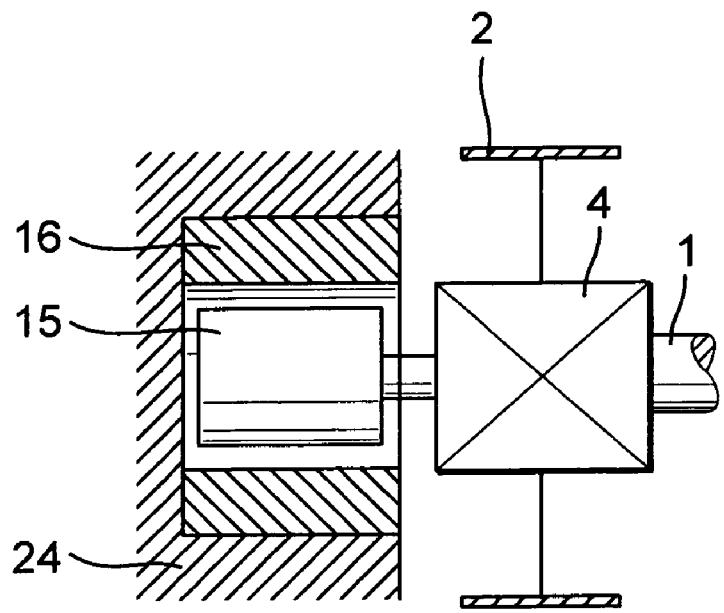
FIG. 3 is a schematic representation of an arrangement of an electromotor connected to the eccentric axial transmission, with a stator mounted on the cylinder head.

FIG. 3 is a schematic representation of a construction of a three-shaft transmission in which the stator 16 is arranged within a cylinder head 24. The stator 16 is therefore stationary and upon energization preferably of the electromotor, the rotor 15, by reason of its own speed of rotation that differs from the speed of rotation of the drive pinion 2, will cause a rotation of the thrust plate 17 shown in FIG. 1.

Figure 4:
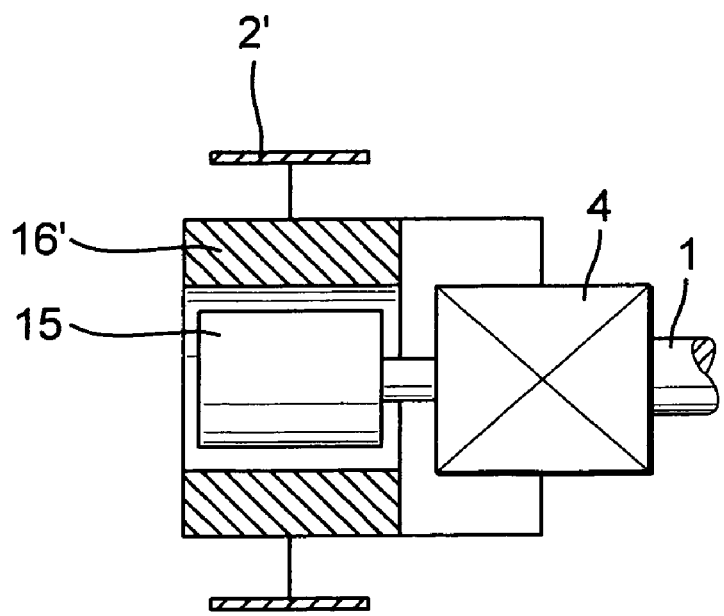
FIG. 4 is a schematic representation of an arrangement of an electromotor connected to the eccentric axial transmission and arranged in a drive pinion.

In FIG. 4, a stator 16' is arranged within a drive pinion 2' and therefore rotates at the speed of rotation of the drive pinion 2', or at half the speed of rotation of the crankshaft of the internal combustion engine. The energization of the electromotor can be effected, for example, through a slip ring or a transponder, not shown.

As best seen in FIG. 1 together with FIG. 2, the invention provides a device for varying valve timing in an internal combustion engine in which a variation of valve timing i.e., a rotation of the camshaft (end portion 1 of the camshaft) relative to the drive pinion 2 is effected through an eccentric axial transmission that has an extremely compact configuration and in which an undesired gearing lash can be avoided. During an adjusting operation, the thrust plate 17 comprising at least one elevation 18 projecting in axial direction is turned relative to the drive pinion 2 such that all portions of the front-end gearing 11 of the disk 10 and of the gearing 9 of the adjusting element 8 arranged on the drive pinion 2 come to mesh successively and partially with one another. With the number of teeth of the gearings 9 and 11 differing from each other by one tooth, one turn of the thrust plate adjusts the camshaft 1 relative to the drive pinion 2 by the angle of the one tooth. The aforesaid advantages are achieved by the fact that the extremely thin-walled and flexible disk 10 is connected rotationally fast to the end portion 1 of the camshaft and is deformed in axial direction by the thrust plate 17.

What is claimed is:

1. A device for varying valve timing in an internal combustion engine, said device comprising an adjusting mechanism for varying an angle of rotation between a drive pinion and a camshaft end portion, said adjusting mechanism being configured as an eccentric axial transmission comprising an adjusting element, said adjusting element being connected rotationally fast to the drive pinion and comprising a first front-end gearing, said adjusting mechanism further comprising a disk comprising a second front-end gearing in a radially outer region, an adjusting movement being imparted to the second front-end gearing by an adjusting thrust plate, said first and second front-end gearings differing from each other by at least one tooth, wherein the disk is connected rotationally fast to the camshaft end portion and is configured in axial direction of the camshaft end portion as a flexible element, and the an adjusting thrust plate deforms the disk in axial direction.

2. A device of claim 1, wherein the adjusting device is configured as a thrust plate that bears against an outer surface of the flexible disk opposite from the second front-end gearing.

3. A device of claim 1, wherein the adjusting device is configured as a thrust plate that bears against an outer surface of the flexible disk opposite from the second front-end gearing, and the thrust plate comprises one or more partial elevations on a surface oriented toward the disk.

4. A device of claim 1, wherein the adjusting device is configured as a thrust plate that bears against an outer surface of the flexible disk opposite from the second front-end gearing, and the thrust plate is supported through a surface oriented away from the disk on a housing wall of the adjusting mechanism.

5. A device of claim 1, wherein a surface of the adjusting element oriented toward the disk has a substantially crowned configuration.

6. A device of claim 1, wherein the adjusting device is configured as a thrust plate that bears against an outer surface of the flexible disk opposite from the second front-end gearing, the thrust plate is supported through a surface oriented away from the disk on a housing wall of the adjusting mechanism, and the thrust plate receives rolling elements through which the thrust plate is axially mounted on the housing wall.

7. A device of claim 1, wherein the adjusting device is configured as a thrust plate that bears against an outer surface of the flexible disk opposite from the second front-end gearing, and the thrust plate receives rolling elements through which the thrust plate is axially mounted on the disk.

8. A device of claim 1, wherein the disk is rotationally fixed at a radially inner portion through at least one ring that is braced against the camshaft end portion by a central screw.

9. A device of claim 1, wherein the thrust plate and a rotor cooperating with the thrust plate are mounted on the camshaft end portion.

* * * * *

UNITED STATES PATENT AND TRADEMARK OFFICE
CERTIFICATE OF CORRECTION

PATENT NO. : 7,047,923 B2
APPLICATION NO. : 11/041036
DATED : May 23, 2006
INVENTOR(S) : Jens Schafer et al.

It is certified that error appears in the above-identified patent and that said Letters Patent is hereby corrected as shown below:

On the Title Page, Insert:

Item [30]   Foreign application Priority data

July 24, 2002 Germany   102 33 698.9

Signed and Sealed this

Twenty-second Day of August, 2006

JON W. DUDAS
*Director of the United States Patent and Trademark Office*